(12) United States Patent
Shen et al.

(10) Patent No.: US 10,423,824 B2
(45) Date of Patent: Sep. 24, 2019

(54) BODY INFORMATION ANALYSIS APPARATUS AND METHOD OF ANALYZING HAND SKIN USING SAME

(71) Applicant: CAL-COMP BIG DATA, INC., New Taipei (TW)

(72) Inventors: Shyh-Yong Shen, New Taipei (TW); Min-Chang Chi, New Taipei (TW); Hui-Teng Lin, New Taipei (TW); Ching-Wei Wang, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 19 days.

(21) Appl. No.: 15/861,576

(22) Filed: Jan. 3, 2018

(65) Prior Publication Data
US 2019/0080162 A1   Mar. 14, 2019

(30) Foreign Application Priority Data

Sep. 8, 2017   (CN) .......................... 2017 1 0803833

(51) Int. Cl.
*G06K 9/00*   (2006.01)
*G06T 7/00*   (2017.01)
*G06K 9/32*   (2006.01)

(52) U.S. Cl.
CPC ....... *G06K 9/00375* (2013.01); *G06K 9/3233* (2013.01); *G06T 7/0002* (2013.01); *G06T 7/0014* (2013.01); *G06T 2207/30196* (2013.01)

(58) Field of Classification Search
CPC ............. G06K 9/00375; G06K 9/3233; G06K 9/3241; G06T 7/0002; G06T 7/0012;
(Continued)

(56) References Cited

U.S. PATENT DOCUMENTS

| 2011/0116691 A1 | 5/2011 | Chung et al. | |
| 2011/0142305 A1* | 6/2011 | Jiang et al. | A61B 5/442 382/128 |
| 2016/0063312 A1* | 3/2016 | Hara et al. | A61B 5/0077 382/103 |

FOREIGN PATENT DOCUMENTS

| JP | 2014147560 A | 8/2014 |
| JP | 5656162 B2 | 1/2015 |

OTHER PUBLICATIONS

Abas Fazly Salleh et al: "Acne Image analysis_Lesion localization and classification", Progress in Biomedical Optics and Imaging, SPIE—International Society for Optical Engineering, Bellingham, WA, US, vol. 9785, Mar. 24, 2016, pp. 97850B-97850B, XP06007044B, ISSN: 1605-7422, DOI: 10.1117/12.2216444, ISBN: 978-1-5106-0027-0.

(Continued)

*Primary Examiner* — Andrew W Johns
(74) *Attorney, Agent, or Firm* — Chung-Ming Shih; HDLS IPR Services

(57) ABSTRACT

A body information analysis apparatus (1) and method of analyzing hand skin by using same are provided. The method includes activating an image fetching module (12) of the body information analysis apparatus (1) to record an external image (61); activating a processing unit (10) of the body information analysis apparatus (1) to recognize one of a plurality of hand images (81, 82, 83, 84, 85, 86, 87, 88) in the external image (61); recognizing an image in one of the hand images (81, 82, 83, 84, 85, 86, 87, 88) corresponding to a defect; marking one of the hand images (81, 82, 83, 84, 85, 86, 87, 88) based on a location of the image having a defect; and activating a display module (111) of the body information analysis apparatus (1) to show the marked one of the hand images (81, 82, 83, 84, 85, 86, 87, 88).

15 Claims, 13 Drawing Sheets

(58) Field of Classification Search
CPC . G06T 2207/30088; G06T 2207/30196; A61B 5/441; A61B 5/442; A61B 5/444
See application file for complete search history.

(56) References Cited

OTHER PUBLICATIONS

Anonymous: "This App Can Track How Well Your Skin-Care Products Are Working", Aug. 8, 2017, XP055462650, Received from the Internet: URL:http://www.cosmopolitan.com/style-beauty/beauty/a11648158/youcam-makeup-app-skin-analysis/ [retrieved on Mar. 26, 2018].
Search Report dated Apr. 12, 2018 of the corresponding European patent application.

* cited by examiner

BODY INFORMATION ANALYSIS APPARATUS AND METHOD OF ANALYZING HAND SKIN USING SAME

BACKGROUND OF THE INVENTION

1. Technical Field

The technical field relates to apparatuses and methods, and more particularly relates to a body information analysis apparatus and a method of analyzing hand skin using same.

2. Description of Related Art

Makeup is performed by women almost every day. Typically, cosmetic is applied to the face of an individual. But more and more individuals may apply cosmetics to other parts of the body such as the hands and the neck in recent years.

Different from face makeup, makeup of parts of the body other than the face does not include all areas because these areas are relatively large. Thus, only defects (e.g., speckles and wrinkles) are applied with cosmetics to alter the appearance of the skin.

However, an individual has to find the defects by using the eyes. Thus, it is a time-consuming thing to find the defects especially for individuals having less such experience. As a result, cosmetics may take a longer time or even compromise the purposes of cosmetics.

Thus, the need for an apparatus for quickly finding the defects of the body and eliminating the above drawbacks exists.

SUMMARY OF THE INVENTION

The disclosure is directed to a body information analysis apparatus and method of analyzing hand skin by using same capable of detecting and marking locations of hand defects to facilitate a subsequent makeup.

It is therefore a first object of the present disclosed example to, in one of the exemplary embodiments, provide a method of analyzing hand skin by using a body information analysis apparatus, comprising the steps of activating an image fetching module of the body information analysis apparatus to record an image; activating a processing unit of the body information analysis apparatus to recognize one of a plurality of hand images in the image; recognizing an image in one of the hand images corresponding to a defect; marking one of the hand images based on a location of the image having a defect; and activating a display module of the body information analysis apparatus to show the marked one of the hand images.

It is a second object of the present disclosed example to, in one of the exemplary embodiments, provide a body information analysis apparatus, comprising an image fetching module for recording an image; a processing unit electrically connected to the image fetching module and including a hand recognition module for recognizing a plurality of hand images in the image; a defects detection module for detecting an image having a defected body part in each of the hand images; and a mark module for marking each of the hand images based on a location of the image having a defected body part; and a display module electrically connected to the processing unit for showing the marked one of the hand images.

The present disclosed example has the following advantages and benefits in comparison with the conventional art:

The present disclosed example is capable of automatically detecting hand defects and marking same so that a user can intuitively take a plan of makeup suggested by the present disclosed example, thereby greatly decreasing difficulties of finding an optimum plan of makeup and significantly increasing makeup efficiency.

The above and other objects, features and advantages of the present disclosed example will become apparent from the following detailed description taken with the accompanying drawings.

DETAILED DESCRIPTION OF THE INVENTION

Embodiments of the present disclosed example will now be described, by way of example only, with reference to the accompanying drawings.

The present disclosed example discloses a body information analysis apparatus (hereinafter called analysis apparatus) 1 and a method of analyzing hand skin by using the analysis apparatus 1 (hereinafter called analysis method). The analysis method can detect various defects on the hand skin and show the detected defects on a screen of the analysis apparatus 1. Thus, a user may easily find the defects and take appropriate actions (e.g., makeup) to alter the appearance of the hand.

Figure 1:
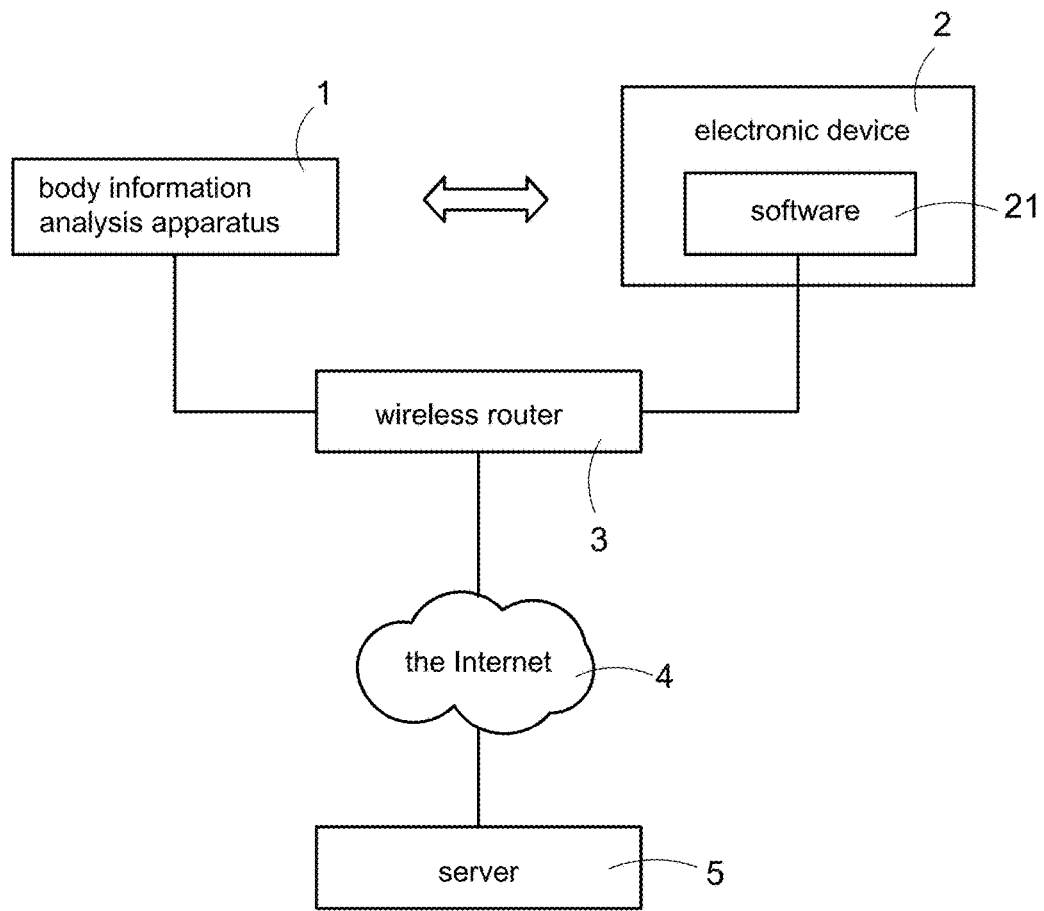
FIG. 1 is a block diagram of a system according to the present disclosed example.

Referring to FIG. 1, it is a block diagram of a system according to the present disclosed example. In an embodiment of FIG. 1, a user may operate an electronic device 2 to set the analysis apparatus 1. Specifically, software 21 is stored in memory (not shown) of the electronic device 2. The software 21 (e.g., application software developed by the manufacturer of the analysis apparatus 1) is adapted to control the electronic device 2. Also, a user can perform the software 21 to cause the analysis apparatus 1 to accept user input data, show images of the user (e.g., face images or hand images), and/or set various predetermined values.

In an embodiment, the user may directly operate an input interface (e.g., an input interface 15 of FIG. 4) of the analysis apparatus 1 for setting purposes.

In an embodiment, Wi-Fi, Bluetooth, Zigbee, radio frequency (RF), infrared, optical communication, audio communication and/or any of other wireless communication techniques can be employed by a wireless transmission module (e.g., a wireless transmission module 16 of FIG. 4) of the analysis apparatus 1 for data transfer.

In an embodiment, the analysis apparatus 1 is connected to a wireless router 3 of the same area. The wireless router 3 is connected to the Internet 4. Thus, the analysis apparatus 1 may update its firmware, perform uploading and perform downloading via the Internet 4. Further, the analysis apparatus 1 may transmit body information including external images, hand images and/or defects images (as detailed later) of the user to a remote server 5 via the Internet 4. Thus, the user may view from a remote location. Furthermore, the analysis apparatus 1 may be connected to a database (not shown) of the server 5 via the wireless router 3 and the Internet 4 for data update or search. The database of the server 5 serves as a backup of the information.

Figure 2:
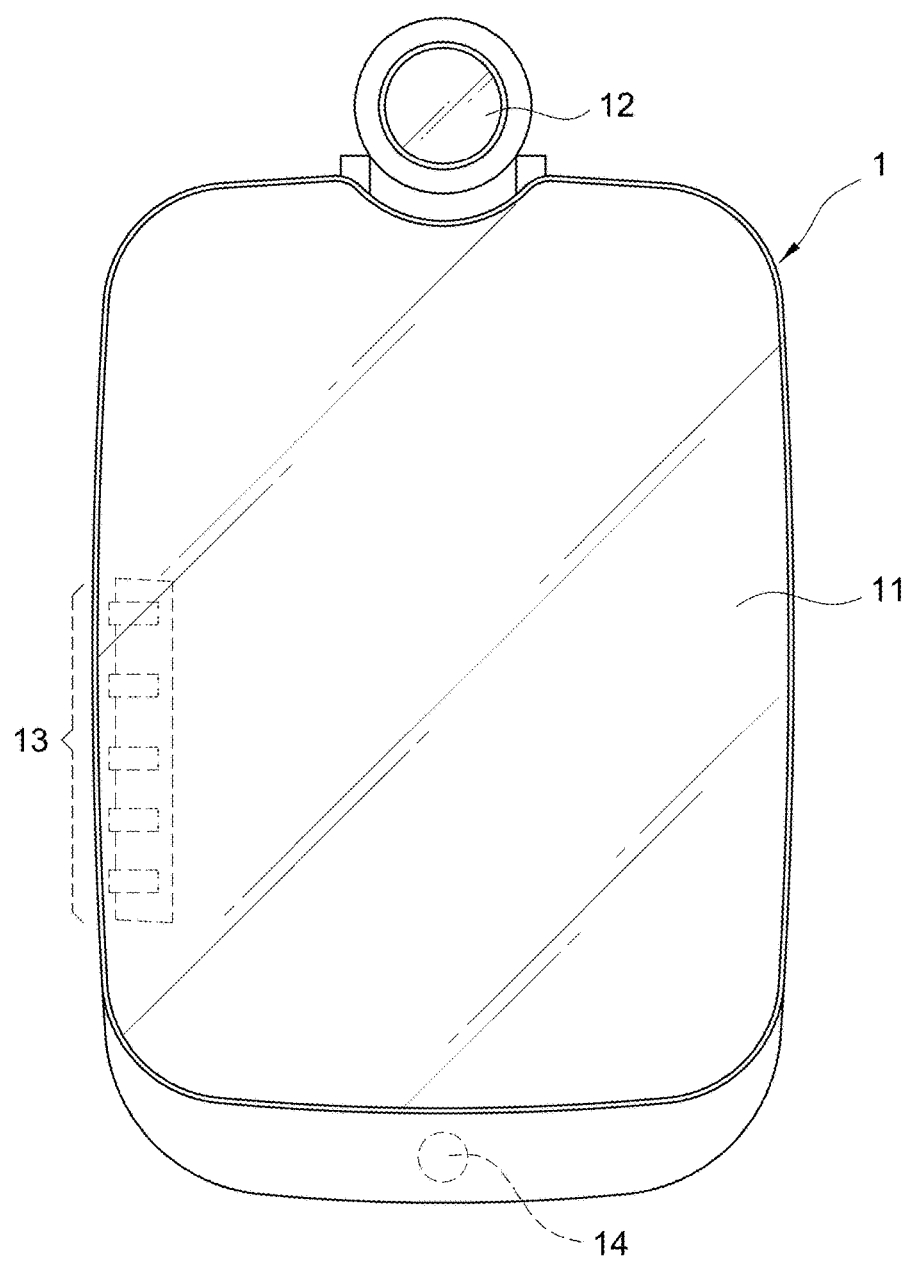
FIG. 2 is a top view of a body information analysis apparatus.
Figure 3:
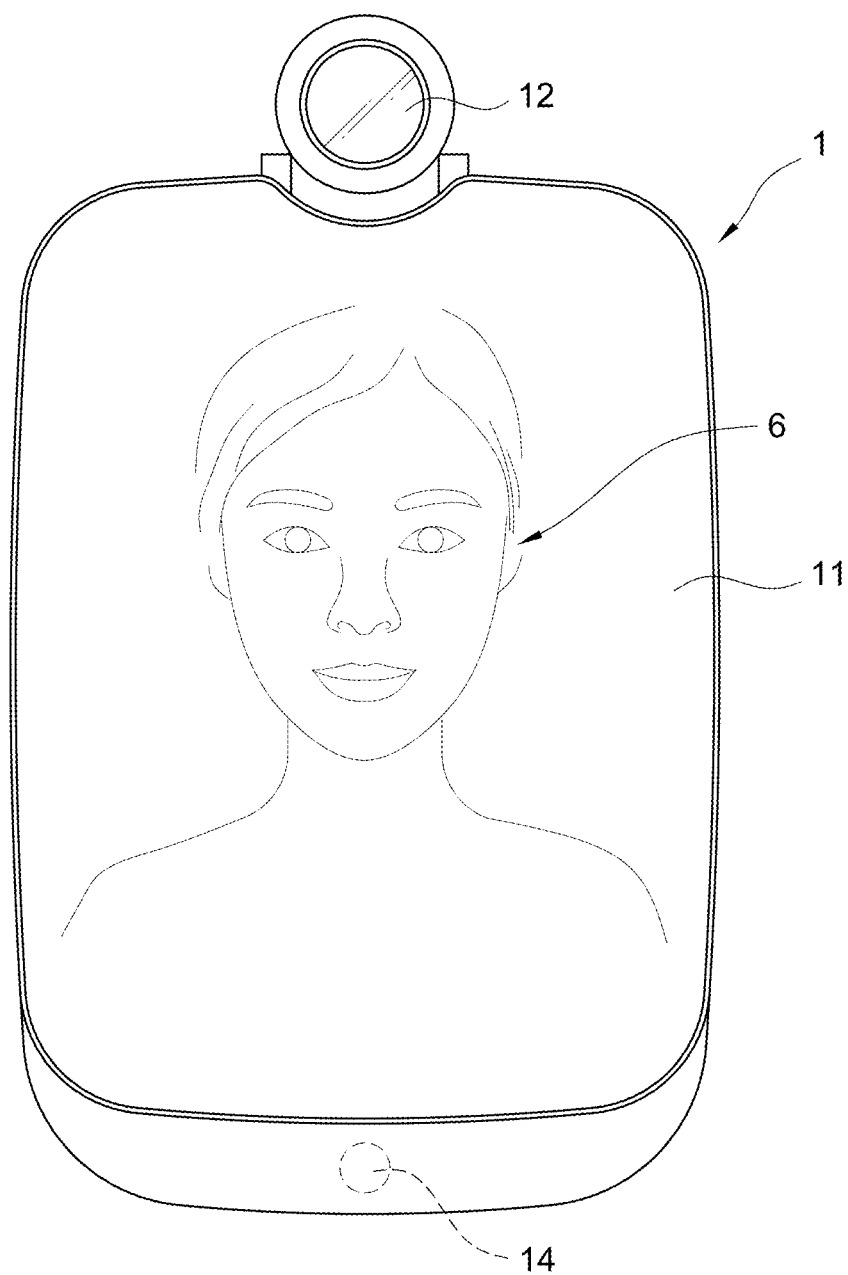
FIG. 3 is a view similar to FIG. 2 with an image shown thereon.

Referring to FIGS. 2 and 3 in which FIG. 2 is a top view of the analysis apparatus 1 and FIG. 3 is a view similar to FIG. 2 with an image shown thereon. In FIGS. 2 and 3, the analysis apparatus 1 is provided in a bedroom or bathroom so that a user may easily detect and analyze information of the body parts including the face, the neck, the hand and the skin. The analysis apparatus 1 comprises a screen 11. After activating the analysis apparatus 1 (see FIG. 2), a graphical user interface (GUI) is shown on the screen 11 and the user may interact with the GUI. Further, after deactivating the analysis apparatus 1 (see FIG. 3), the screen 11 can be used as a mirror so that the user can see his or her image 6 in the screen 11.

The analysis apparatus 1 of the disclosed example is used to detect defects on the skin of a user and mark the detected defects for alerting the user so that the user may apply makeup to alter the appearance of the defects. As described above, the screen 11 can be used to show the GUI or the image 6 of the user, thereby enabling the user to analyze the skin for makeup purpose and providing help as discussed later.

In an embodiment, the analysis apparatus 1 further comprises an image fetching module 12. The image fetching module 12 is provided on the analysis apparatus 1 and is capable of adjusting its angle with respect to the analysis apparatus 1. In an embodiment, the image fetching module 12 can take a high resolution picture of the body part (e.g., the face, the neck or the hand) of the user and convert same into a digital image. The analysis apparatus 1 can analyze the body information and/or makeup progress by using the image. In another embodiment, the image fetching module 12 can fetch external information (e.g., one-dimensional (1D) barcode or two-dimensional (2D) barcode) for obtaining data therefrom.

Also, the analysis apparatus 1 sends the image obtained by the image fetching module 12 to the screen 11 for showing. Thus, the user can see his or her image 6 on the screen 11 when the analysis apparatus 1 is activated.

Further, the analysis apparatus 1 may process the image in real time by locating the defects or indicating types of the defects and send the processed image to the screen 11 for showing.

Thus, the analysis apparatus 1 may provide additional information to the user by means of augmented reality (AR) so that the user may see his or her image on the screen 11 when applying makeup.

In an embodiment, the screen 11 is implemented as a touchscreen and the user can give input through a simple gesture by touching the screen 11 with one or more fingers.

The analysis apparatus 1 further comprises a plurality of keys 13. In the embodiment, the keys 13 are implemented as buttons or touch keys in a non-limiting manner. The user may press the key 13 to operate the GUI (e.g., activating the GUI to return to homepage, previous page, or next page), or cause the analysis apparatus 1 to perform a corresponding function (e.g., activating the screen 11, deactivating the screen 11, or activating the image fetching module 12).

The analysis apparatus 1 further comprises one or more sensor (e.g., thermometer and hygrometer) 14 for sensing environment conditions of the analysis apparatus 1. By utilizing the analysis apparatus, accuracy of detection and analysis of the body image of the user can be greatly increased. In an embodiment, the sensor 14 is a motion sensor so that the analysis apparatus 1 may activate the motion sensor 14 to sense the gesture (e.g., moving leftward, moving rightward, moving upward, moving downward, moving forward, or moving rearward) of the user. In such a manner, the user may give input to the analysis apparatus 1 by a gesture without touching the screen 11 or pressing the key 13. This has the benefit of leaving no fingerprints.

Figure 4:
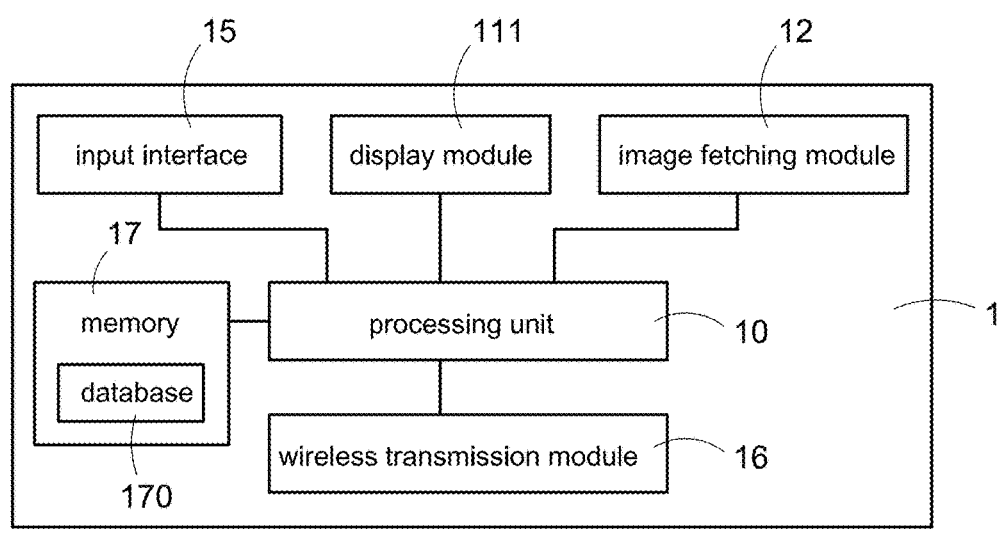
FIG. 4 is a block diagram of the body information analysis apparatus.

Referring to FIG. 4, it is a block diagram of the analysis apparatus 1. In FIG. 4, the analysis apparatus 1 comprises a display module 111, an image fetching module 12, an input interface 15, a wireless transmission module 16, a memory 17, and a processing unit 10 electrically connected to all of the above components.

In an embodiment, the image fetching module 12 is a camera or movie camera for capturing images (e.g., the face of a user) and recording external information. The analysis apparatus 1 may analyze the images to recognize the body parts such as face recognition, neck recognition or hand recognition. As a result, the face, the neck or the hand of the user can be analyzed. Alternatively, corresponding actions are performed based on the external information.

The display module 111 is used to show the GUI. In an embodiment, the display module 111 is disposed in the screen 11. In response to activating the display module 111, light of the display module 111 passes through the one-way light penetration glass (not shown) of the screen 11 to be detected by the eyes of the user. Thus, the user may see the GUI on the screen 11. In response to deactivating the display module 111, the user only can see his or her image 6 on the screen 11 due to the nature of the one-way light penetration glass. In an embodiment, the analysis apparatus 1 may adjust light intensity or display areas of the display module 111 so that the screen 11 may show the GUI while reflecting the image 6 of the user.

The analysis apparatus 1 receives user input via the input interface 15 so that the user may interact with the GUI or perform setting. In an embodiment, the input interface 15 is the sensor 15 for sensing user gestures input. In another embodiment, the input interface 15 is an image fetching module 12 for capturing images and recording external information. In yet another embodiment, the input interface 15 is a touchscreen or the key 1 for receiving user input. In a further embodiment, the input interface 15 is a microphone for converting sound into an electrical signal.

The wireless transmission module 16 functions to connect to the Internet 4. Specifically, the user accesses the analysis apparatus 1 via the Internet 4 for viewing information (e.g., body information) recorded by the analysis apparatus 1.

The memory 17 functions to store data. In an embodiment, the memory 17 comprises a database 170 for storing data (e.g., body information of the user, voice instructions issued by the analysis apparatus 1, information of cosmetics owned by the user, video clips for teaching how to apply makeup, and/or a corresponding plan).

In another embodiment, the database 170 is not provided in the memory 17 of the analysis apparatus 1 and is provided in a remote server 5. Thus, the analysis apparatus 1 may access the database 170 at the server 5 via the Internet 4 for data update or search. As such, the storage space of the local memory 17 is greatly decreased.

The processing unit 10 is connected to the display module 111, the image fetching module 12, the input interface 15, the wireless transmission module 16 and the memory 17. The memory (not a volatile memory) 17 stores computer executable codes (not shown). The processing unit 10 can carry out the analysis method by executing the computer executable codes.

Figure 5:
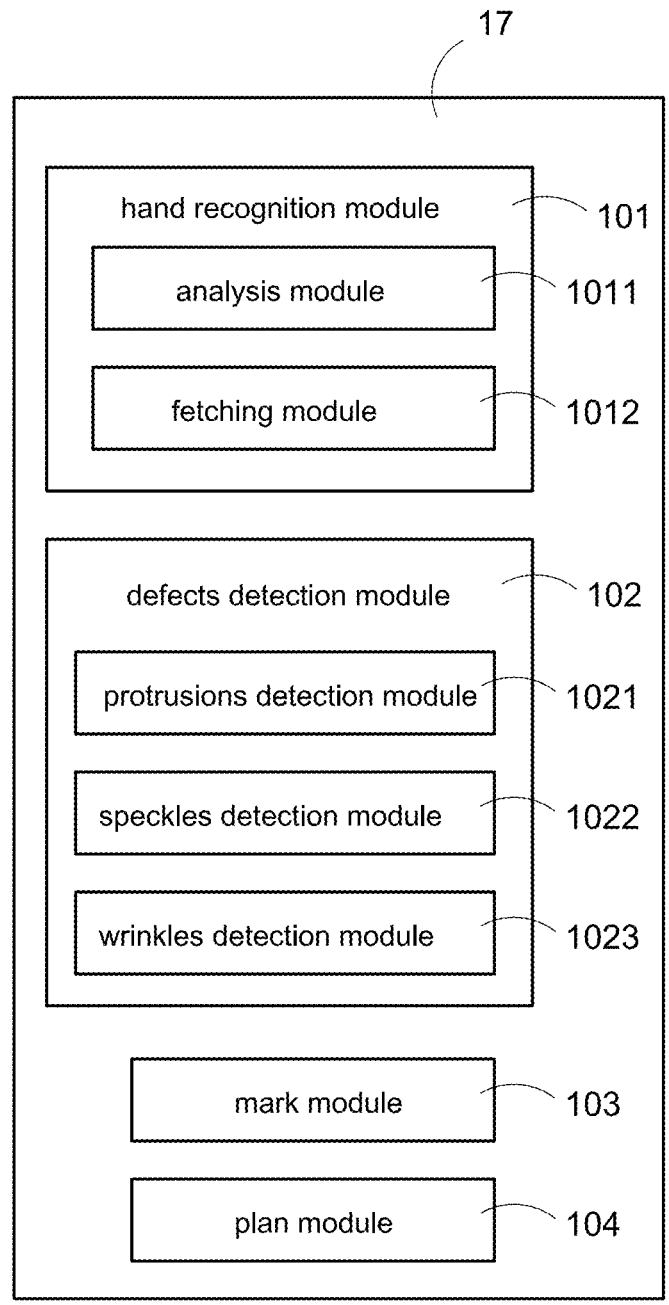
FIG. 5 is a block diagram of the memory.

Referring to FIG. 5, it is a block diagram of the memory 17. Specifically, the computer executable codes include a plurality of program codes each corresponding to a different module. The processing unit 10 can carry out the analysis method of the present disclosed example by executing the program codes. Therefore, functions of the modules can be performed. The computer executable codes can be classified as computer executable codes of the following modules:

A hand recognition module 101 is used to perform a hand recognition processing for recognizing the hand in the external image fetched by the image fetching module 12. Specifically, the hand recognition module 101 can recognize the hand in the external image.

In an embodiment, the hand recognition module 101 includes an analysis module 1011 and a fetching module 1012. The analysis module 1011 can performs a feature analyze processing to the external image to recognize feature points of parts in the external image (e.g., a plurality of feature points 7 of FIG. 8). The feature points 7 correspond to different features of the body (e.g., the hand) of the user such as tips of the fingers, the knuckles, the palm, or the wrist. Also, the analysis module 1011 can determine range of the body parts in the images based on the features and the fetching module 1012 can fetch images having the body parts from the images based on the range of the body parts in the images.

A defects detection module 102 is used to detect defects of the body parts in the fetched images. Specifically, the defects detection module 102 can recognize the defects images having defected body parts from the body parts of the fetched images.

In an embodiment, the defects detection module 102 can execute different algorithms to recognize various images having defected body parts from the body parts in the images. The algorithms are used to recognize kinds of defects images having defected body parts each corresponding to one of different defects. Thus, the defects detection module 102 can recognize locations of the defects based on locations of the defects images having defected body parts and determine the kinds of the defects (e.g., protrusions, speckles, wrinkles or cavities) based on the used algorithm (e.g., protrusions detection algorithm, speckles detection algorithm, wrinkles detection algorithm or cavities detection algorithm).

In the embodiment of FIG. 5, the defects detection module 102 includes a protrusions detection module 1021, a speckles detection module 1022, and a wrinkles detection module 1023 in a non-limiting manner.

The protrusions detection module 1021 is used to detect protrusions of the body parts in the images. Specifically, the protrusions detection module 1021 performs a binary processing on the body parts in the images to create a plurality of black and white images based on various thresholds. Further, the protrusions detection module 1021 performs a protrusions detection processing to detect protrusions of the black and white images to recognize protruded defects images having protruded defects. Furthermore, the protrusions detection module 1021 sets protrusion extent of the protruded defects images having protruded defects based on the black and white images of the protruded defects images having defected body parts having recognized protrusions.

The speckles detection module 1022 is used to detect speckles of the body parts in the images. Specifically, the speckles detection module 1022 filters out some feature points (e.g., the finger nails or the eyeballs which are not capable of creating speckles) from the feature points of the body parts in the images, sets regions of interest (ROI) in the body parts in the images based on the filtered features, and performs a speckles detection processing to detect speckles in the regions of interest to recognize locations and ranges of the speckles images having defected body parts having speckles.

The wrinkles detection module 1023 is used to detect wrinkles of the body parts in images. Specifically, the wrinkles detection module 1023 sets regions of interest in the body parts of the images, performs a boundary detection processing to detect boundaries of the regions of interest to obtain wrinkles images, performs a line detection processing for a line detection of the wrinkles images to recognize lengths and locations of the detected lines images having lines, filters out the lines images having lines not less than wrinkles thresholds (i.e., filtering out lines of non-wrinkle such as blood vessels or elongated lines of the protruded fasciae, or elongated lines of the fingerprints), and taking the remaining lines images as wrinkles defects images having defected body parts having wrinkles.

A mark module 103 is used to perform a mark processing to mark the recognized defects images having defected body parts. Specifically, the mark module 103 can mark the body parts in the images based on locations of the defects images having defected body parts. For example, the mark module 103 marks by means of contours. For instance, the mark module 103 marks the contours of the images having defected body parts by means of lines or patterns. Alternatively, the mark module 103 marks by means of coloring. For instance, the mark module 103 fills the defected regions of the images having defected body parts by red, yellow or green color.

A plan module 104 is used to make plan of makeup for detected defects. Specifically, the database 170 stores many different plans of makeup including altering the appearances of the defects by means of specific cosmetics and applying makeup by means of specific cosmetics. Each plan of makeup corresponds to one of many different defects. The plan module 104 searches corresponding plan of makeup in the database 170 based on the kinds of defects in the corresponding defects images having defected body parts and sends the searched plan of makeup to the display module 111 for display.

In many embodiments of the present disclosed example, both the analysis apparatus 1 and the analysis method are used to analyze hand skin. Specifically, the analysis module 1011 identifies many hand feature points 7 in the images. The fetching module 1012 identifies and fetches the hand image from the image based on the hand feature points 7. Next, the defects detection module 102 detects defects in the hand image. For example, the protrusions detection module 1021 is used to detect protrusions of the hand image, the speckles detection module 1022 is used to detect speckles of the hand image, and the wrinkles detection module 1023 is used to detect wrinkles of the hand of image. Next, the mark module 103 is used to mark the recognized images having defected body parts and the marked hand image is sent to the display module 111 for display. Finally, the plan module 104 searches corresponding plan of makeup and sends the same to the display module 111 for display.

Therefore, the user may see locations of defects of the hand skin on the display module 111 and plan of makeup proposed by the analysis apparatus 1.

Figure 6:
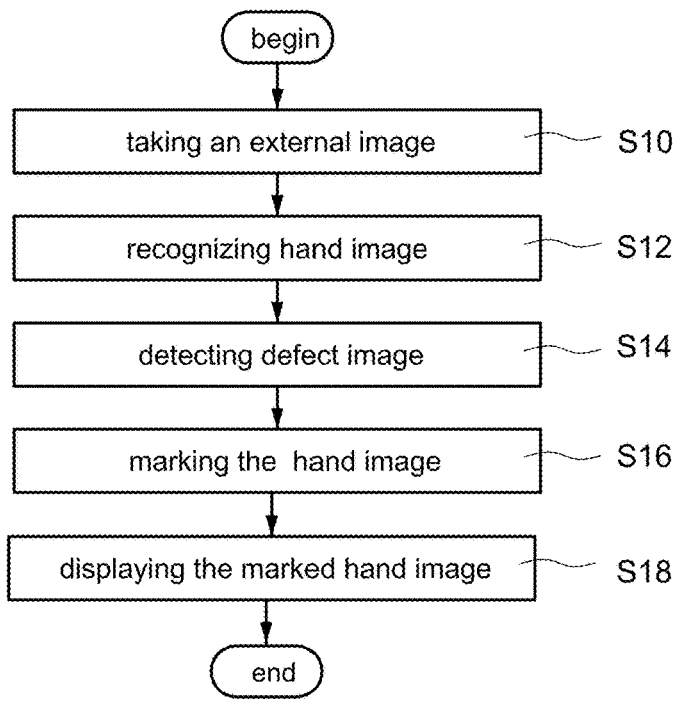
FIG. 6 is a flow chart illustrating a method of analyzing hand skin by using the body information analysis apparatus according to the present disclosed example.

Referring to FIG. 6, it is a flow chart illustrating a method of analyzing hand skin using the analysis apparatus 1 according to the present disclosed example. The analysis apparatus 1 of the present disclosed example employs the processing unit 10 to execute the computer executable codes (e.g., functional modules 101-104), thereby allowing the steps of the analysis method to implement the various embodiments of the present disclosed example.

It is noted that the analysis method of the present disclosed example is not limited to analyze hand skin while the following description is directed to the analysis of hand skin. In other embodiments, the steps of the analysis method of the present disclosed example can be used to analyze the skin of any of other body parts such as analysis of face skin or analysis of back skin.

The analysis method of the present disclosed example comprises the following steps:

Step S10: The processing unit 10 of the analysis apparatus 10 instructs the image fetching module 12 to take a high resolution picture of a user and convert same into a digital image (such as the external image 61 of FIG. 8).

In an embodiment, the processing unit 10 instructs the display module 111 to display the external image 61, thereby giving an electronic mirror effect.

Step S12: The processing unit 10 instructs the hand recognition module 101 to recognize the hand image in the external image 61 and find location and range of the hand image in the external image 61.

Step S14: The processing unit 10 instructs the defects detection module 102 to detect defects of the fetched image in order to recognize whether there are any defects on the hand skin corresponding to the hand image.

Specifically, the defects detection module 102 can detect the defects on the hand image by means of various detection algorithms. For example, the defects detection module 102 determines that there are defects on the hand skin of the user if any defects appearing on the hand image have been recognized. Further, the defects detection module 102 can determine the kinds of the defects by using a defects detection algorithm.

In an embodiment, the defects detection module 102 analyzes the defects image in order to determine the extent of the defects on the hand skin. For example, the defects detection module 102 determines the extents of the defects based on the sizes or ranges of the defects image.

Step 16: The processing unit 10 instructs the mark module 103 to mark the recognized defects image on the hand image by making marks thereon.

In an embodiment, the processing unit 10 instructs the mark module 103 to mark the defect hand image based on locations of the protrusions of the defect hand and the extent of the protrusion. The processing unit 10 instructs the mark module 103 to mark the defect hand image based on the locations and ranges of the speckles appearing on the image if the image has speckles on the defect hand. The processing unit 10 instructs the mark module 103 to mark the defect hand image based on the locations and lengths of the wrinkles appearing on the image if the image has wrinkles on the defect hand.

Step S18: The processing unit 10 instructs the display module 111 to display the marked hand image.

In an embodiment, the analysis apparatus 1 instructs the processing unit 10 to display kinds of defects (e.g., displayed by text or pictures or played by audio). Alternatively, the analysis apparatus 1 instructs the processing unit 10 to read description of the defects from the database 170 based on the kinds of defects or the extent of defect. For example, reasons of generation or proposed solutions are presented by text, pictures or audio. Finally, it is displayed on the display module 111 or produced by a loudspeaker.

The present disclosed example automatically detects hand defects and marks the detected hand defects so that a user may take measures with respect to the hand having defects, thereby greatly decreasing the makeup difficulties and increasing the makeup efficiency.

Figure 7:
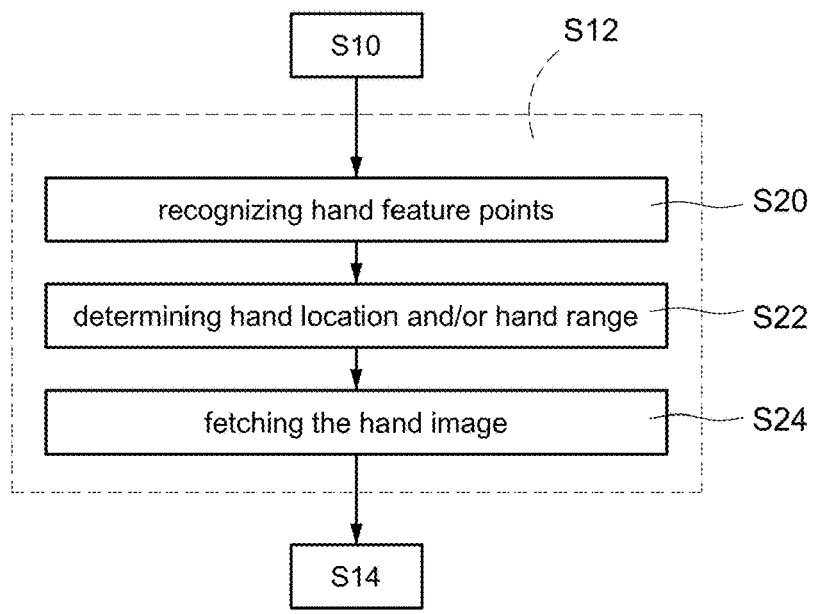
FIG. 7 is a flow chart illustrating details of step S12.
Figure 8:
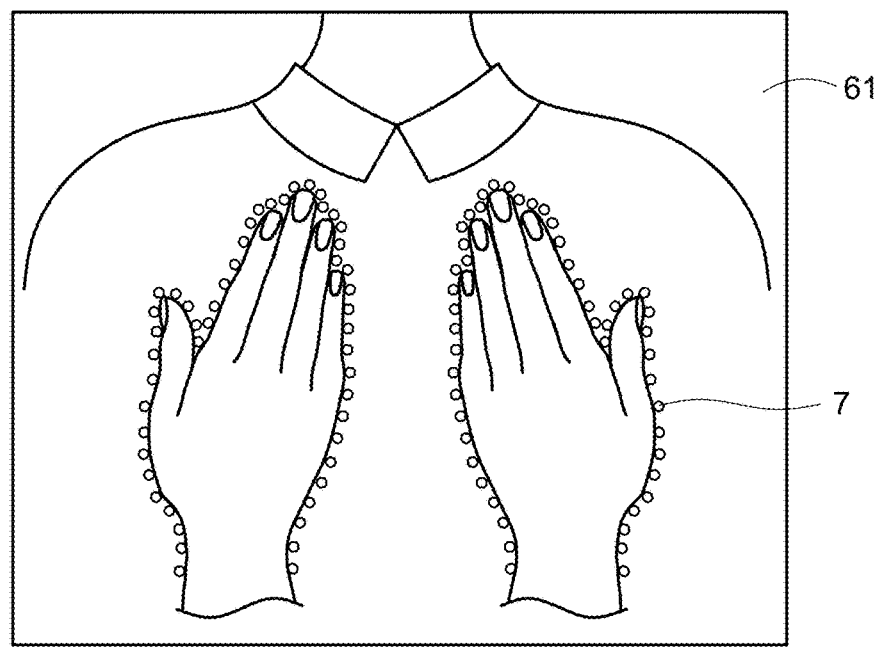
FIG. 8 schematically depicts hand recognizing action.

Referring to FIGS. 7 and 8 in conjunction with FIG. 6 in which FIG. 7 is a flow chart illustrating details of step S12, and FIG. 8 schematically depicts hand recognizing action. In comparison with the embodiment of FIG. 6, step S12 of the analysis method of the present disclosed example further comprises the following steps:

Step S20: The analysis apparatus 1 instructs the processing unit 10 to activate the analysis module 1011 to analyze features of the external image 61 in order to hand feature points in the external image 61.

Specifically, the features analysis is done by performing a feature landmark algorithm with respect to the external image 61 so that features of the body parts (e.g., the hand discussed later) in the external image 61 can be recognized in a non-limiting manner. Further, the feature landmark algorithm is implemented by using Dlib library.

Referring to FIG. 8, for analyzing features, the analysis module 1011 employs the feature landmark algorithm with respect to the external image 61. The feature landmark algorithm is known in the art as a machine learning technique for analyzing the specific body parts in the external image 61. Thus, feature points of one or more body parts (e.g., the hand, the face, the feet, the neck or the shoulder) can be recognized in the external image 61 (e.g., the hand recognized in FIG. 8). The feature points are designated 7 in FIG. 8. The feature points 7 correspond to different features of the specific body parts.

Taking hand recognition as an exemplary example, the feature points correspond to the knuckle, the muscles and the fingertip of each finger, the palm and the wrist. Taking face recognition as an exemplary example, the feature points correspond to the peak and both ends of the eyebrow, both ends of the eye, the ridge and both sides of the nose, the ears and the lobes. The number of the feature points is 68, 198 or any of other numbers in a non-limiting manner.

Also, the feature landmark algorithm can be performed to mark the feature points of the specific body parts in the external image 61. As shown in FIG. 8, the feature landmark algorithm is performed to mark the hand feature points 7 in the external image 61.

In an embodiment, the analysis module 101 assign numbers to the features based on the body parts that the features belong to. The present disclosed example can recognize locations of the body parts in the image based on the numbers, shapes and sequences. As a result, the body parts in the image can be recognized.

Referring to FIG. 7 again, after step S20, the analysis module 1011 of the processing unit 101 identifies the plurality of hand feature points 7. The step S22 is then executed. The processing unit 101 determines location of the hand and/or range of the hand in the external image 61 by activating the fetching module 1012 based on the hand feature points 7.

Step S24: The processing unit 10 fetches a hand image from the external image 61 by activating the fetching module 1012 based on the location of the hand and/or the range of the hand in the external image 61.

Therefore, the present disclosed example can precisely recognize and fetch a hand image from the external image 61. Also, after fetching the external image, the present disclosed example can further decrease the data quantity and the image size to be detected, thereby greatly increasing precision and increasing rate of subsequent defects detection.

Figure 9:
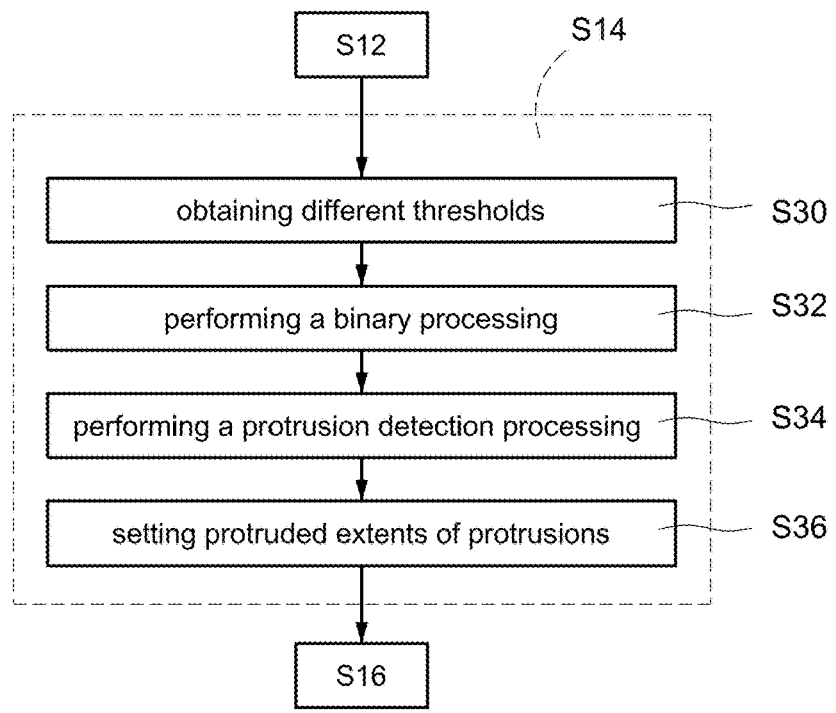
FIG. 9 is a flow chart illustrating details of step S14 according to a first preferred embodiment of the present disclosed example.
Figure 10A:
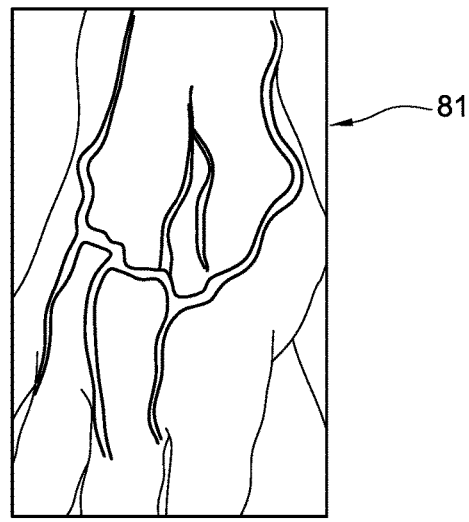
FIG. 10A is a photograph showing the hand to be analyzed.
Figures 10B, 10C:
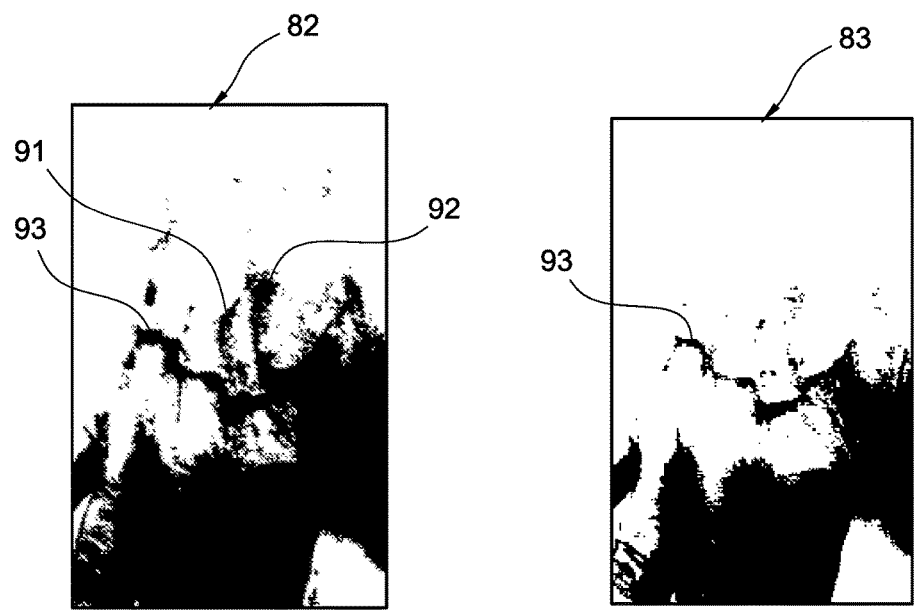
FIG. 10B is another photograph showing the hand of FIG. 10A.
FIG. 10C is still another photograph showing details of the hand of FIG. 10B.

Referring to FIGS. 9, 10A, 10B and 10C in conjunction with FIG. 6 in which FIG. 9 is a flow chart illustrating details of step S14 according to a first preferred embodiment of the present disclosed example, FIG. 10A is a photograph showing the hand to be analyzed, FIG. 10B is another photograph showing the hand of FIG. 10A, and FIG. 10C is still another photograph showing details of the hand of FIG. 10B.

In the embodiment, the analysis apparatus 1 is capable of detecting protrusions. In detail, the analysis apparatus 1 can automatically detect defects such protrusions caused by blood vessels, scars, or fascia and recognize locations and the extent of protrusions thereof which are used as basis for makeup. In comparison with the embodiment of FIG. 6, the step S14 of the analysis method of the embodiment further comprises the following step:

Step S30: The processing unit 10 of the analysis apparatus 10 activates the protrusions detection module 1021 to obtain a plurality of different thresholds in which the different thresholds correspond to different extents of protrusions.

In an embodiment, a user sets the different thresholds in advance based on a pixel value range of the hand image and stores same in the memory 17 in a non-limiting manner.

For example, there are three thresholds (e.g., 64, 128 and 192) corresponding to "shallow", "intermediate" and "protruded" respectively if the hand image is an 8-bit gray scale image having a pixel value ranged from 0 to 255.

In another embodiment, the analysis apparatus 1 determines a reference pixel value based on the gray scale of the hand image and sets a plurality of thresholds based on the reference pixel value and the pixel value range.

For example, there are two thresholds corresponding to two different extents of protrusion if the hand image has an 8-bit gray scale with pixel value 0 representing the darkest and pixel value 255 representing the brightest). Also, the color of the protruded portions of the hand image is darker than other portions of the hand image, i.e., the more significant of the protrusion the darker of the color and the lower of the pixel value. The analysis apparatus 1 takes an average (e.g., 128) of the pixel values of the skin regions of the hand image as a reference pixel value. The first threshold 88 is obtained by subtracting a first predetermine value (e.g., 40) from the reference pixel value, and the second threshold 64 is obtained by subtracting a second predetermine value (e.g., 64) from the reference pixel value. The thresholds correspond to different extents of protrusion. For example, the first threshold 88 correspond to the extent of protrusion "less protruded", and the second threshold 64 correspond to the extent of protrusion "greatly protruded".

Step S32: The processing unit 10 activates the protrusions detection module 1021 to create a plurality of black and white hand images by performing a binary processing on the hand image based on each threshold.

In another embodiment, the processing unit 10 converts the color hand image into a gray scale based hand image. And in turn, the processing unit 10 activates the protrusions detection module 1021 to create a plurality of black and white hand images by performing a binary processing on the gray scale based hand image based on each threshold.

It is noted that each pixel value of each pixel of the gray scale based hand image is compared with a threshold when the binary processing is performed. Color of a corresponding location of the black and white hand image is set as white if the pixel value of the pixel is greater than the threshold. To the contrary, color of a corresponding location of the black and white hand image is set as black if the pixel value of the pixel is not greater than the threshold.

Generally speaking, lower pixel value (e.g., 0) represents dark color (e.g., black) and high pixel value (e.g., 255) represent bright color (e.g., white). The greater of the threshold processed by the binary processing, the higher of the probability of each pixel of the black and white hand image being black is. Thus, both protruded features having a slight protrusion and protruded features having a significant protrusion are shown in the created black and white image. To the contrary, the smaller of the threshold processed by the binary processing, the lower of the probability of each pixel of the black and white hand image being black is. Thus, only protruded features having a significant protrusion are shown in the created black and white image.

Thus, by setting different thresholds, the present disclosed example causes the black and white hand image to show different extents of protrusion of the protruded features.

As shown in FIGS. 10A to 10C, for example, the processing unit 10 performs a gray scale processing on a color hand image 81 to create a gray scale based hand image. Further, the processing unit 10 performs a binary processing on the gray scale based hand image twice based on the first threshold (e.g., 128) and the second threshold (e.g., 64) to create a first black and white hand image 82 and a second black and white hand image 83 respectively.

Step S34: The processing unit 10 activates the protrusions detection module 1021 to detect protrusions of each black and white hand image in order to recognize the protrusion defect images in which each protrusion defect images corresponds to protrusions on the defect hand skin. The above protrusions detection can be done by a known image processing technique and thus a detailed description thereof is omitted herein for the sake of brevity.

As shown FIGS. 10B and 10C, the processing unit 10 detects protrusions in the first black and white hand image 82 and identifies that there are three protrusion defect images 91, 92 and 93. Also, the processing unit 10 detects protrusions in the second black and white hand image 83 and identifies that there is one protrusion defect image 93.

Step S36: The processing unit 10 activates the protrusions detection module 1021 to detect protrusions of each black and white hand image and determines thresholds corresponding to the detected protrusions. Further, the thresholds are used to set the protruded extents of protrusions in the protrusion defect image having the defected body parts.

In an embodiment, the processing unit 10 identifies a plurality of protrusion defect images having the same defected body parts from the black and white hand images. Thus, the processing unit 10 creates a plurality of thresholds from the black and white hand images and the thresholds correspond to different protruded extents of the protrusions in the images. Also, the processing unit 10 selects the protrusion having the most significant extent of protrusion as the protruded extent of the protruded defects.

As shown in FIGS. 10B and 10C, for example, the first threshold of the black and white hand image 82 corresponds to a "shallow" protrusion, and the second threshold of the black and white hand image 83 corresponds to a "significant" protrusion. Thus, the processing unit 10 sets the protruded extent of the protruded defects corresponding to the protrusion defect images 91 and 92 as "shallow", and sets the protruded extent of the protruded defects corresponding to the protrusion defect image 93 as "significant".

As a result, the present disclosed example can effectively recognize any protruded defects and precisely determine the protruded extent of the protruded defects.

Figure 11:
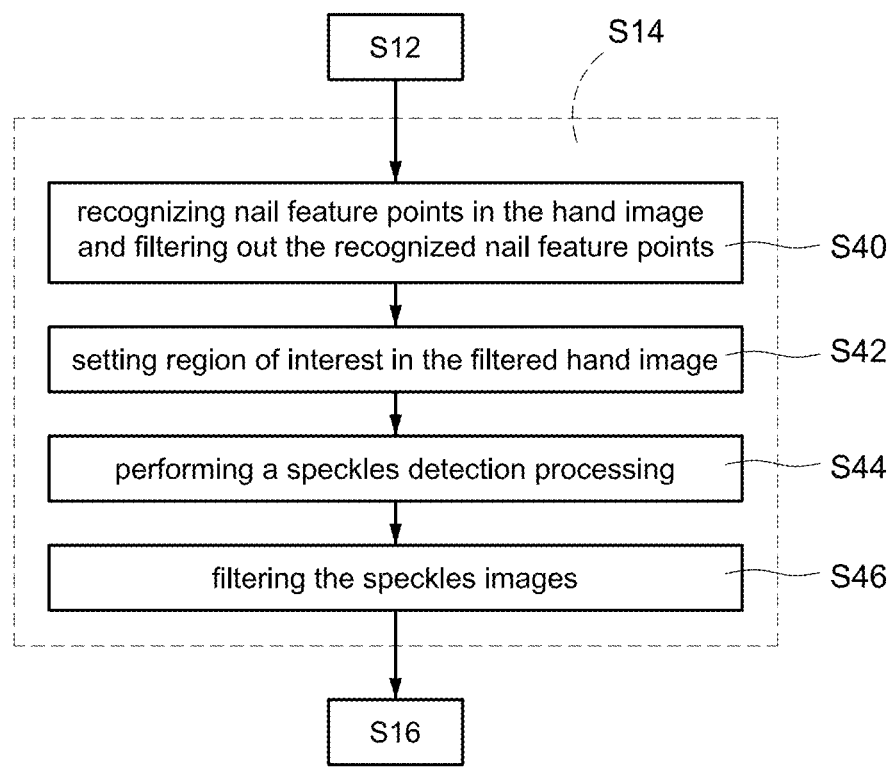
FIG. 11 is a flow chart illustrating details of step S14 according to a second preferred embodiment of the present disclosed example.
Figure 12A:
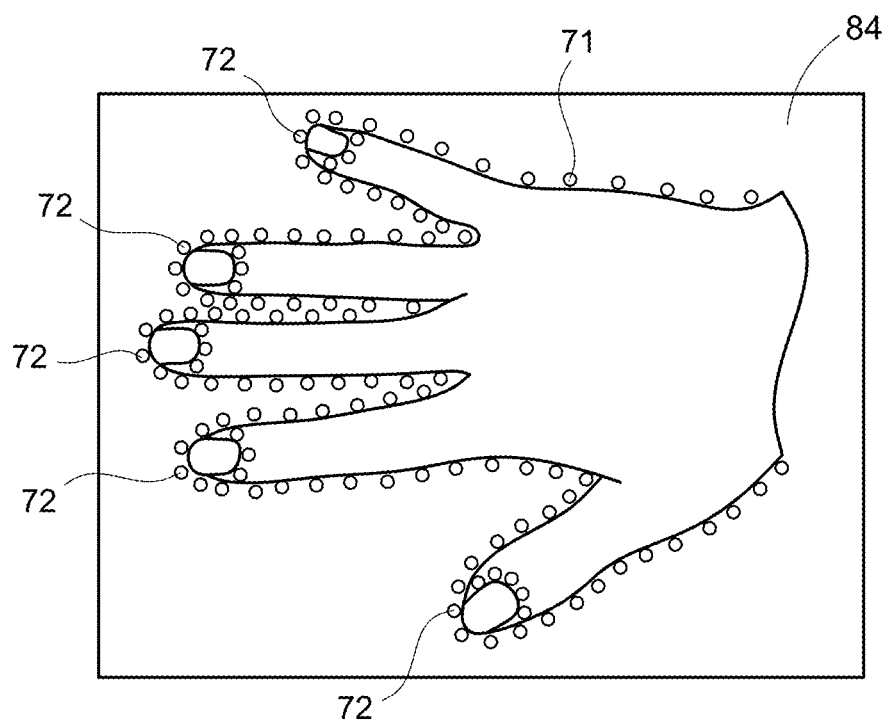
FIG. 12A schematically depicts speckles of the hand.
Figure 12B:
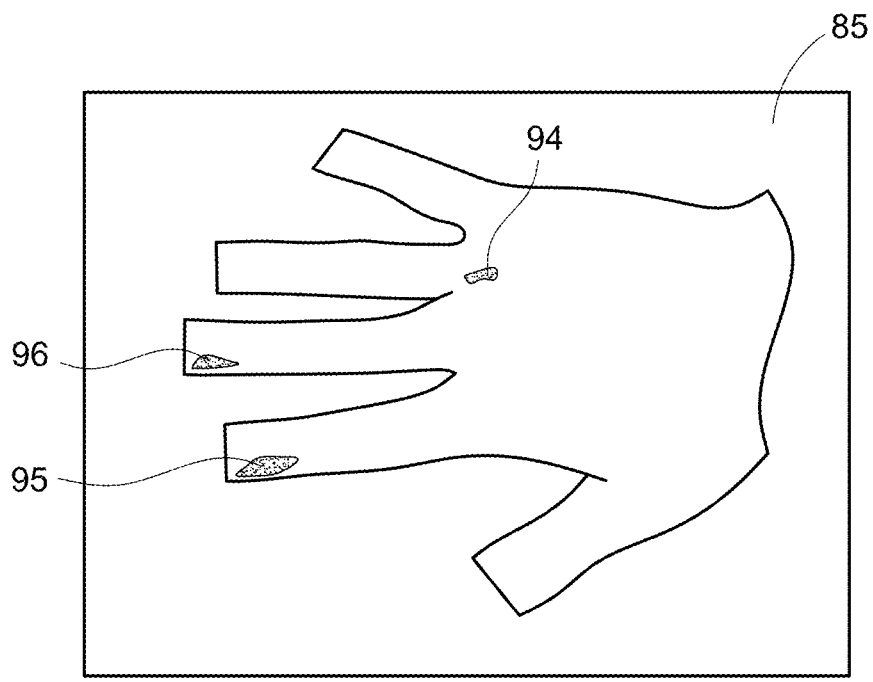
FIG. 12B further schematically depicts speckles of the hand.

Referring to FIGS. 11A, 12A and 12B in conjunction with FIG. 6 in which FIG. 11 is a flow chart illustrating details of step S14 according to a second preferred embodiment of the present disclosed example, FIG. 12A schematically depicts speckles of the hand, and FIG. 12B further schematically depicts speckles of the hand.

In the embodiment, the analysis apparatus 1 is capable of detecting speckles. In detail, the analysis apparatus 1 can automatically detect locations of the speckles (e.g., red speckles or dark speckles) on the skin so that a user may take them as a reference for makeup. In comparison with the embodiment of FIG. 6, step S14 of the analysis method of the present disclosed example further comprises the following steps:

Step S40: The analysis apparatus 1 instructs the processing unit 10 to activate the speckles detection module 1022 to obtain a hand image 84 which has its features been analyzed. Also, the speckles detection module 1022 identifies the hand feature points 71 in the hand image 84 in order to recognize a plurality of nail feature points 72 in the hand image 84 corresponding to the nails. Next, the processing unit 10 filters out the recognized nail feature points 72 from the hand feature points 71 and thereafter creates a hand image 85 which has been filtered in which the filtered hand image 85 does not include the nails.

Step S42: The processing unit 10 instructs the speckles detection module 1022 to set regions of interest in the filtered hand image 85. As shown in FIG. 12B, the regions of interest (e.g., the shown hand regions) of the hand image 85 do include the nail image.

It is noted that the nail does not form speckles. The present disclosed example can greatly increase accuracy, precision and processing rate with respect to subsequent speckles detection by filtering out nail images in advance.

Step S44: The processing unit 10 instructs the speckles detection module 1022 to detect speckles in the regions of interest in order to recognize a plurality of speckles images in the hand image 85 and confirm locations and ranges (e.g., regions or lengths) of the speckles.

The above speckles detection can be done by a known image processing technique which employs a pore analysis algorithm for skin detection in cooperation with a graph analysis (i.e., sampling with respect to RGB color space or LAB color space prior to the graph analysis) and a binary algorithm. However, its detailed description is omitted herein for the sake of brevity.

Step S46: The processing unit 10 activates the speckles detection module 1022 to filter the speckles images in order to filter out speckles images having a range less than a threshold of the speckles and take the remaining speckles images as speckled defects images. Next, the processing unit 10 instructs the speckles detection module 1022 to set the remaining speckles images as speckled defects images having speckled defects.

Specifically, the processing unit 10 reads a predetermined threshold (e.g., region of 0.3 $cm^2$ or length of 0.5 cm) of the speckles from the memory 17 and compares the range of each speckles image (e.g., region or length of each image of speckles) with the predetermined threshold of the speckles. Also, the processing unit 10 determines that this speckles image is not an speckled defects image (e.g., an image having specks caused by protruded blood vessels or fascia, or an image having specks caused by shade) if the range of any speckles image is less than the threshold of the speckles. Thus, a subsequent marking is not necessary. To the contrary, the processing unit 10 determines that this speckles image is a speckled defects image if the range of any speckles image is not less than the threshold of the speckles. Therefore, the present disclosed example can effectively recognize speckled defects and precisely determine location and range of each speckled defect.

As shown in FIG. 12B, the processing unit 10 can recognize a plurality of speckled images 94-96 from the regions of interest of the hand image 85, filter out the speckled image 94 having a value less than the threshold of the speckles, and set the remaining speckled images 95 and 96 as speckled defects images (i.e., the speckled defects images 95 and 96 having speckled defects corresponding to different speckled defects respectively).

Therefore, the present disclosed example can effectively recognize speckled defects and precisely determine location and range of each speckled defect.

Figure 13:
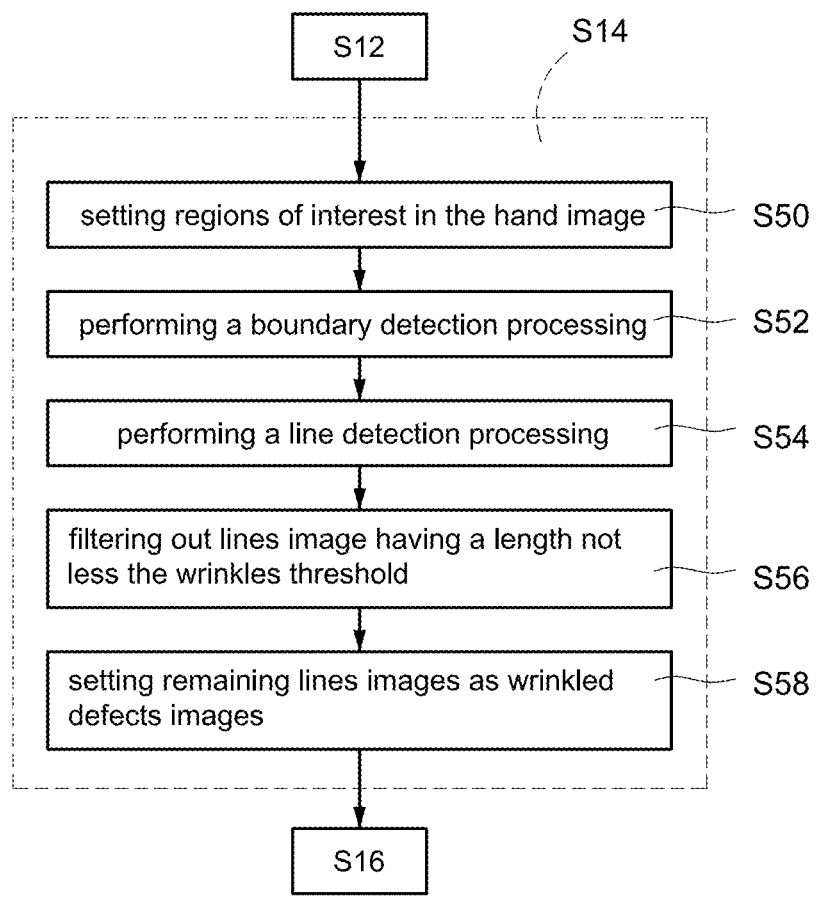
FIG. 13 is a flow chart illustrating details of step S14 according to a third preferred embodiment of the present disclosed example.
Figure 14A:
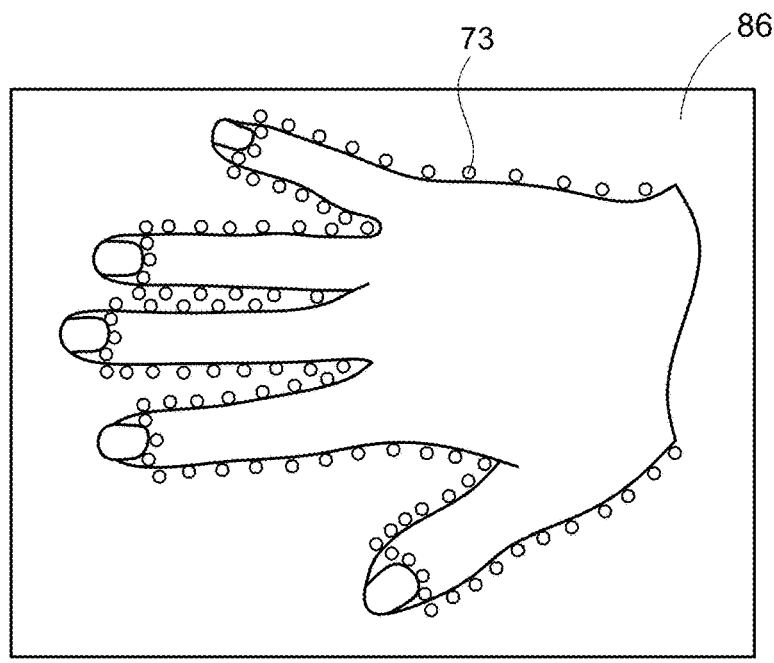
FIG. 14A is a photograph showing the hand to be analyzed.
Figure 14B:
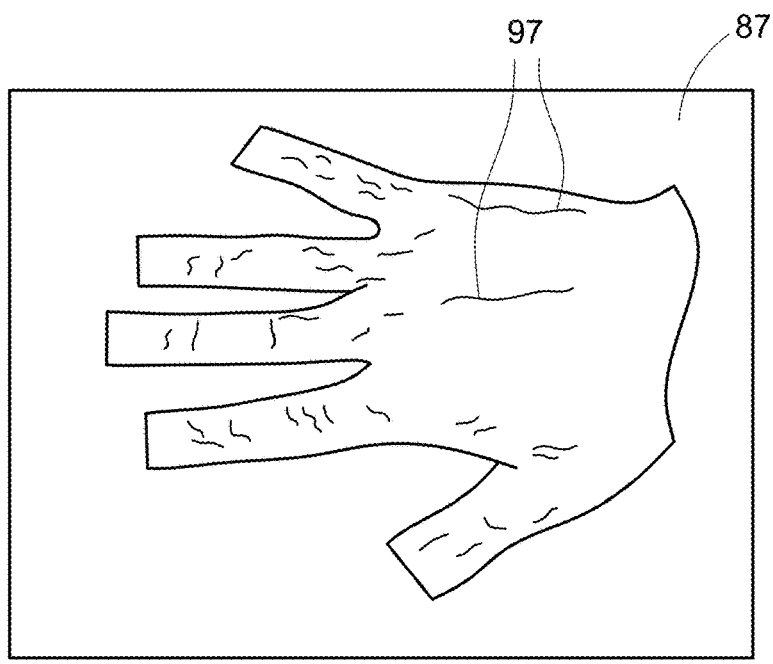
FIG. 14B is another photograph showing the hand of FIG. 14A.
Figure 14C:
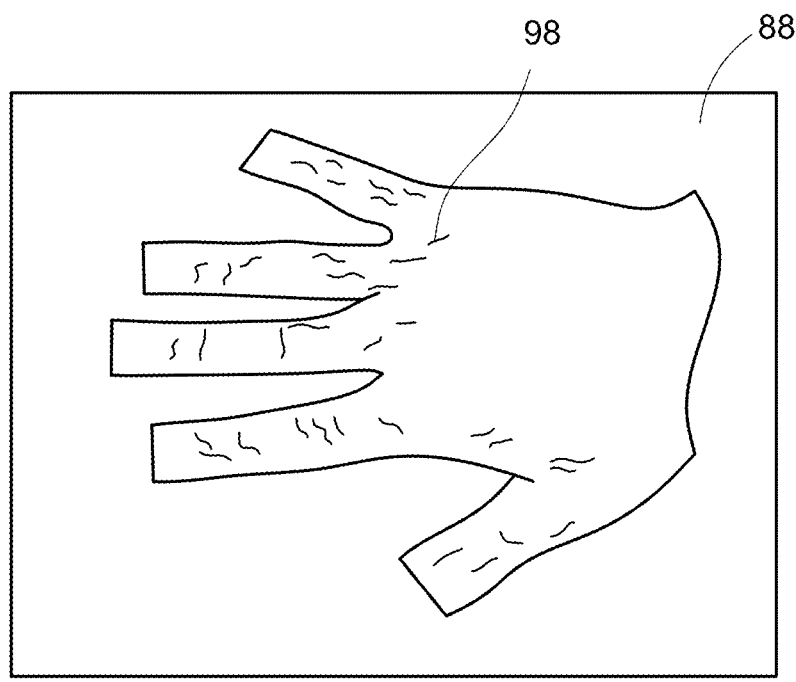
FIG. 14C is still another photograph showing details of the hand of FIG. 14B.

Referring to FIGS. 13 and 14A to 14C in conjunction with FIG. 6 in which FIG. 13 is a flow chart illustrating details of step S14 according to a third preferred embodiment of the present disclosed example, FIG. 14A is a photograph showing the hand to be analyzed, FIG. 14B is another photograph showing the hand of FIG. 14A, and FIG. 14C is still another photograph showing details of the hand of FIG. 14B.

In the embodiment, the analysis apparatus 1 is capable of detecting wrinkles. In detail, the analysis apparatus 1 can automatically detect locations of the wrinkles on the skin which are taken as reference for makeup by a user. In comparison with the embodiment of FIG. 6, step S14 of the analysis method of the present disclosed example further comprises the following steps:

Step S50: The processing unit 10 of the analysis apparatus 1 activates the wrinkles detection module 1023 to set regions of interest in the hand image 86.

In an embodiment, the processing unit 10 sets regions of interest (see FIG. 14A) of the hand image 86 based on the hand feature points 73 which has nail features being filtered out. The regions of interest do include the nail image.

It is noted that the nail does not form wrinkles. The present disclosed example can greatly increase accuracy, precision and processing rate with respect to subsequent wrinkles detection by filtering out nail images in advance.

Step S52: The processing unit 10 instructs the wrinkles detection module 1023 to detect wrinkles in the regions of interest of the hand image 86 in order to detect a boundary and create wrinkles hand images having wrinkles.

The above boundary detection can be done by a known image processing technique which employs a Canny edge detection algorithm to analyze the boundaries of the regions of interest and create black and white wrinkles hand images (see the wrinkles hand images 87 of FIG. 14B). However, its detailed description is omitted herein for the sake of brevity.

Step S54: The processing unit 10 instructs the wrinkles detection module 1023 to detect lines in the wrinkles hand image 87 in order to recognize a plurality of lines 97 in the wrinkles hand image 87, and determine length and location of each lines image 97.

The lines detection can be done by a known image processing technique which can recognize the lines images 97 included in the wrinkles hand image 87 and calculate corresponding length and location of each lines image 97. However, its detailed description is omitted herein for the sake of brevity.

Step S56: The processing unit 10 instructs the wrinkles detection module 1023 to filter out the lines image 97 having a length less the threshold of the wrinkles and take the remaining lines image 97 as wrinkle defects images.

Specifically, the processing unit 10 reads a predetermined threshold of the wrinkles from the memory 17 and compares the length of each line image 97 with the predetermined threshold of the wrinkles. Also, the processing unit 10 determines that this image having lines images 97 is not a wrinkle defects image if the length of any line 97 is not less than the wrinkles threshold (e.g., a line image caused by protruded blood vessels or fascia, or an elongated line image formed by wrinkles). Thus, a subsequent marking is not necessary.

Step S58: The processing unit 10 instructs the wrinkles detection module 1023 to set the remaining lines images 97 as defected wrinkles (e.g., a plurality of wrinkles defect 98 in the hand image 88 of FIG. 14C).

In an embodiment, the processing unit 10 determines that this image having lines 97 is a wrinkles defect image 98 if the length of any line 97 is not less than the threshold of the wrinkles.

Therefore, the present disclosed example can effectively recognize wrinkle defects and precisely determine location and range of each wrinkle defect.

Figure 15:
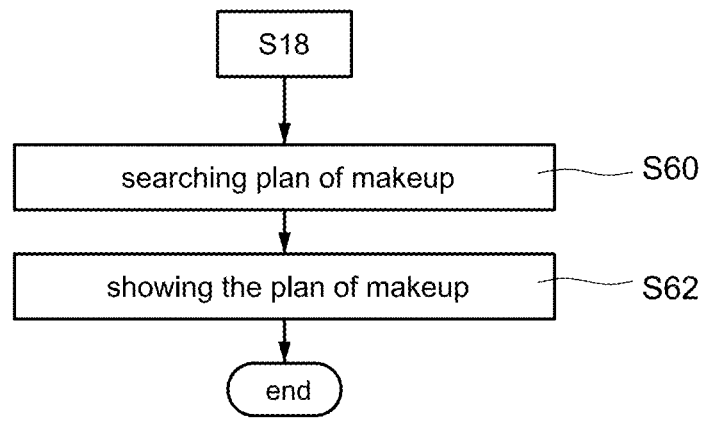
FIG. 15 is a flow chart illustrating steps after step S18.

Referring to FIG. 15 in conjunction with FIG. 6 in which FIG. 15 is a flow chart illustrating steps after step S18.

In the embodiment, the analysis apparatus 1 has a "suggestion" function for providing professional opinions with respect to the detected defects so that features can take it as a reference for eliminating the defects.

In comparison with the embodiment of FIG. 6, step S18 of the analysis method of the present disclosed example further comprises the following steps:

Step S60: The processing unit 10 of the analysis apparatus 1 instructs the plan module 104 to search plan of makeup in the database 170 based on location, kind, range or extent of each detected defect.

In an embodiment, the processing unit 10 searches the database 170 based on the body information (e.g., skin color) of a user and information of each defect. Also, the user may create information of cosmetics owned by the user in advance in the database 170. The above plan of makeup is provided to a user for reference when applying makeup.

For example, for white skin and dark speckles, the plan of makeup may suggest a user to use a cosmetic capable of giving a better effect of altering the appearance of the defects, thereby completely covering the defects.

In another example, for excessive number of wrinkles and a wide covering region, the plan of makeup may suggest a user to use a less expensive cosmetic for altering the appearance of the defects due to the consideration of saving cost.

Step S62: The processing unit 10 of the analysis apparatus 1 instructs the display module 111 to show the plan of makeup searched by the planes module 104.

Thus, the present disclosed example can provide an optimum plan of makeup based on the detected defects and an inexperienced user can take the plan of makeup as a reference when applying makeup, thereby giving the best cosmetic effect.

While the present disclosed example has been described in terms of preferred embodiments, those skilled in the art will recognize that the present disclosed example can be practiced with modifications within the spirit and scope of the appended claims.

What is claimed is:

1. A method of analyzing hand skin by using a body information analysis apparatus (1), comprising the steps of:
   (a) activating an image fetching module (12) of the body information analysis apparatus (1) to record an external image (61);
   (b) activating a processing unit (10) of the body information analysis apparatus (1) to recognize a hand image (81, 82, 83, 84, 85, 86, 87, 88) in the external image (61);
   (c) recognizing a defect image in the hand image (81, 82, 83, 84, 85, 86, 87, 88) corresponding to a defect;
   (d) marking the hand image (81, 82, 83, 84, 85, 86, 87, 88) based on a location of the defect image; and
   (e) activating a display module (111) of the body information analysis apparatus (1) to show the marked hand image (81, 82, 83, 84, 85, 86, 87, 88).

2. The method as claimed in claim 1, wherein step (b) comprises the sub-steps of:
   (b1) recognizing a plurality of hand feature points (7, 71, 73) in the external image (61) wherein the hand feature points (7, 71, 73) correspond to a plurality of different features of the hand respectively;
   (b2) determining a hand location and a hand range based on the hand feature points (7, 71, 73); and
   (b3) fetching the hand image (81, 82, 83, 84, 85, 86, 87, 88) from the external image (61) based on the hand location and the hand range.

3. The method as claimed in claim 2, wherein step (c) comprises the sub-steps of:
   (c11) obtaining a plurality of different thresholds;
   (c12) performing a binary processing on the hand image (81, 82, 83, 84, 85, 86, 87, 88) to create a plurality of black and white hand images based on each of the thresholds;
   (c13) performing a protrusion detection processing on each of the black and white hand images to recognize a protruded defect image (91, 92, 93) in at least one of the black and white hand images; and
   (c14) setting a protrusion extent of the protruded defect image (91, 92, 93) based on the threshold corresponding to the black and white hand image comprising the recognized protruded defect image (91, 92, 93).

4. The method as claimed in claim 3, wherein in step (d) a mark is done on the hand image (81, 82, 83, 84, 85, 86, 87, 88) based on a location of the protruded defect image (91, 92, 93) in the black and white hand image and the protrusion extent of the protruded defect image (91, 92, 93).

5. The method as claimed in claim 2, wherein step (c) comprises the sub-steps of:
   (c21) filtering a plurality of nail features (72) out of the hand feature points (7, 71, 73);
   (c22) setting a region of interest in the hand image (81, 82, 83, 84, 85, 86, 87, 88) based on the filtered hand feature points (7, 71, 73);
   (c23) performing a speckles detection processing on the region of interest to recognize a plurality of speckles images (94, 95, 96) and determine a location and a range of each of the speckles images (94, 95, 96); and
   (c24) filtering out at least one of the speckles images (94, 95, 96) having a value of range less than a speckles threshold of speckles and taking the remaining speckles images (94, 95, 96) as speckles defect images.

6. The method as claimed in claim 5, wherein in step (d) a mark is done on the hand image (81, 82, 83, 84, 85, 86, 87, 88) based on the location and the range of each of the speckles images (94, 95, 96).

7. The method as claimed in claim 2, wherein step (c) comprises the sub-steps of:
   (c31) setting a region of interest in the hand image (81, 82, 83, 84, 85, 86, 87, 88);
   (c32) performing a boundary detection processing on the region of interest to create a wrinkles hand image;
   (c33) performing a line detection processing on the wrinkles hand image to recognize a plurality of lines images (97) and determine a length and a location of each of the lines image (97); and
   (c34) filtering out at least one of the line image (97) having a line length not less than a wrinkles threshold and taking the remaining lines images (97) as a plurality of wrinkle defects images (98).

8. The method as claimed in claim 7, wherein in step (d) a mark is done on the hand image (81, 82, 83, 84, 85, 86, 87, 88) based on a length of each of the wrinkle defects images (98) and a location of the wrinkle defects images (98) in the wrinkles hand image.

9. The method as claimed in claim 1, further comprising the steps of:
   (f1) searching a plan of makeup in a database (170) based on a kind of the defect corresponding to the defect image; and
   (f2) sending the searched plan of makeup to the display module (111) for display.

10. A body information analysis apparatus (1), comprising:
   an image fetching module (12) for recording an external image (61);
   a processing unit (10) electrically connected to the image fetching module (12) and including:
   a hand recognition module (101) for recognizing a hand image (81, 82, 83, 84, 85, 86, 87, 88) in the external image (61);
   a defects detection module (102) for recognizing a defect image corresponding to a defect in the hand image (81, 82, 83, 84, 85, 86, 87, 88); and
   a mark module (103) for marking the hand image (81, 82, 83, 84, 85, 86, 87, 88) based on a location of the defect image; and
   a display module (111) electrically connected to the processing unit (10) for showing the marked hand image (81, 82, 83, 84, 85, 86, 87, 88).

11. The body information analysis apparatus (1) as claimed in claim 10, wherein the hand recognition module (101) includes:
   an analysis module (1011) for recognizing a plurality of hand feature points (7, 71, 73) in the external image (61) and determining a hand location and a hand range based on the hand feature points (7, 71, 73) wherein the hand feature points (7, 71, 73) correspond to a plurality of different hand features respectively; and
   a fetching module (1012) for fetching the hand images (81, 82, 83, 84, 85, 86, 87, 88) from the external image (61) based on the hand location and the hand range.

12. The body information analysis apparatus (1) as claimed in claim 11, wherein the defects detection module (102) includes a protrusions detection module (1021) for performing a binary processing on the hand image (81, 82, 83, 84, 85, 86, 87, 88) respectively to create a plurality of black and white hand images based on a plurality of different thresholds, performing a protrusions detection processing on the black and white hand image to recognize a plurality of protruded defect images (91, 92, 93), and setting a protruded extent of the protruded defect images (91, 92, 93) based on the thresholds corresponding to the black and white hand images comprising the protruded defect images (91, 92, 93) wherein the mark module (103) marks the hand image (81, 82, 83, 84, 85, 86, 87, 88) based on a location of the protruded defect images (91, 92, 93) in the black and white hand image and the protruded extent of the images (91, 92, 93) having a protruded defect.

13. The body information analysis apparatus (1) as claimed in claim 11, wherein the defects detection module (102) includes a speckles detection module (1022) for filtering a plurality of nail features (72) out of the hand feature points (7, 71, 73) wherein the nail features (72) correspond to a nail, for setting a region of interest in the hand image (81, 82, 83, 84, 85, 86, 87, 88) based on the filtered hand feature points (7, 71, 73), performing a speckles detection processing on the region of interest to recognize a plurality of speckles images (94, 95, 96) and determine a location and a range of each of the speckles images (94, 95, 96), and filtering out at least one of the speckles images (94, 95, 96) having a value of range less than a speckles threshold and taking the remaining speckles images (94, 95, 96) as a plurality of speckled defects images wherein a mark done by the mark module (103) on the hand image (81, 82, 83, 84, 85, 86, 87, 88) based on a location and a range of each of the speckles images (94, 95, 96).

14. The body information analysis apparatus (1) as claimed in claim 11, wherein the defects detection module (102) includes a wrinkles detection module (1023) for setting a region of interest in the hand image (81, 82, 83, 84, 85, 86, 87, 88), performing a boundary detection processing on the region of interest to create a wrinkles hand image, performing a line detection processing on the wrinkles hand image to recognize a plurality of lines images (97) image and determine a length and a location of each of the lines images (97), and filtering out at least one of the lines images (97) having a line length not less than a wrinkles threshold and taking the remaining lines images (97) as a plurality of wrinkle defects images (98) wherein a mark is done on the hand image (81, 82, 83, 84, 85, 86, 87, 88) based on a length of each of the wrinkle defects images (98) and a location of the wrinkle defects images (98) in the wrinkles hand image.

15. The body information analysis apparatus (1) as claimed in claim 10, further comprising a database (170) electrically connected to the processing unit (10) which further comprises a plan module (104) configured to search a plan of makeup in the database (170) based on a kind of the defect corresponding to the defect image, and send the searched plan of makeup to the display module (111) for display.

* * * * *